United States Patent
Capoldi et al.

(10) Patent No.: US 11,905,996 B2
(45) Date of Patent: Feb. 20, 2024

(54) BEARING WITH AT LEAST ONE SEGMENTED RING

(71) Applicant: Aktiebolaget SKF, Gothenburg (SE)

(72) Inventors: Bruno Capoldi, Charentenay (FR); David Ragot, Guillon (FR); David Bertrand, Vermenton (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/877,130

(22) Filed: Jul. 29, 2022

(65) Prior Publication Data

US 2023/0045163 A1    Feb. 9, 2023

(30) Foreign Application Priority Data

Aug. 2, 2021 (DE) .......................... 102021208342.0

(51) Int. Cl.
  *F16C 33/60* (2006.01)
  *F16C 33/58* (2006.01)

(52) U.S. Cl.
  CPC ............ *F16C 33/60* (2013.01); *F16C 33/586* (2013.01); *F16C 2226/76* (2013.01); *F16C 2300/14* (2013.01)

(58) Field of Classification Search
  CPC .... F16C 19/381; F16C 33/504; F16C 33/586; F16C 33/60; F16C 2226/60; F16C 2226/62; F16C 2226/70; F16C 2226/76; F16C 2300/14
  See application file for complete search history.

(56) References Cited

U.S. PATENT DOCUMENTS

| | | | | |
|---|---|---|---|---|
| 5,657,526 | A * | 8/1997 | Yatcko | F16C 13/04 29/898.04 |
| 8,819,939 | B2 * | 9/2014 | Pohlman | F16C 33/60 29/898.063 |
| 2009/0123104 | A1 * | 5/2009 | Abe | F16C 33/4605 384/570 |
| 2015/0275970 | A1 * | 10/2015 | Terada | F16C 43/06 384/560 |

FOREIGN PATENT DOCUMENTS

JP    2007292305 A  * 11/2007 ............ F16C 19/385

OTHER PUBLICATIONS

Machine Translation of JP-2007292305-A (Year: 2007).*

* cited by examiner

*Primary Examiner* — Alan B Waits
(74) *Attorney, Agent, or Firm* — GARCIA-ZAMOR INTELLECTUAL PROPERTY LAW, LLC; Ruy Garcia-Zamor

(57) ABSTRACT

A bearing provides an outer ring and an inner ring capable of rotating concentrically relative to one another, at least one of the inner and outer rings being split into a plurality of successive circumferential ring segments. For each pair of facing ends of adjacent successive ring segments of the split-ring, one of the facing ends includes at least one protrusion made in one part with the associated ring segment and protruding into a recess of complementary shape formed onto the other facing end to align the pair of facing ends in radial direction.

7 Claims, 5 Drawing Sheets

BEARING WITH AT LEAST ONE SEGMENTED RING

CROSS-REFERENCE TO RELATED APPLICATIONS

This application claims priority to German Patent Application no. 102021208342.0, filed Aug. 2, 2021, the contents of which is fully incorporated herein by reference.

TECHNICAL FIELD OF THE INVENTION

The present invention relates to the field of bearings. The invention notably relates to the field of large diameter rolling bearings that can accommodate axial and radial loads and having an inner ring and an outer ring arranged concentrically about an axis of rotation running in an axial direction.

BACKGROUND OF THE INVENTION

Such large diameter rolling bearings may be used for example in a tunnel boring machine, in a mining extraction machine or in a wind turbine. Large diameter rolling bearings may also be used in the field of defence such as radars or chars.

A large diameter rolling bearing comprises generally two concentric inner and outer rings, and at least one row of rolling elements, such as rollers, radially interposed between the rings.

In some fields of applications, the rolling bearing is delivered with inner and outer rings formed as split rings in order to allow the transport and/or the assembly on the corresponding machine. In such case, each of the inner and outer rings is split into a plurality of successive circumferential ring segments.

Therefore, after delivery, the ring segments must be joined together to assemble each split-ring.

However, during assembly, the ring segments may not be aligned in the radial direction. In this case, the assembly process of the rolling bearing is interrupted until the ring segments are disassembled and then realigned.

This adjustment step may be laborious, interrupts the assembly process and leads to increased costs of the overall rolling bearing.

One aim of the present invention is to overcome these drawbacks.

SUMMARY OF THE INVENTION

The invention relates to a bearing comprising an outer ring and an inner ring capable of rotating concentrically relative to one another, at least one of the inner and outer rings being split into a plurality of successive circumferential ring segments.

According to a general feature, for each pair of facing ends of adjacent successive ring segments of the split-ring, one of the facing ends comprises at least one protrusion made in one part with the associated ring segment and protruding into a recess of complementary shape formed onto the other facing end to align the pair of facing ends in radial direction.

With such an arrangement, the ring segments of the split ring may be easily and perfectly aligned in the radial direction during assembly. The use of such protrusion and recess facilitates the assembly and avoids disassembling the split ring in cases where the alignment of the ring segments is not perfect. The overall costs can be reduced, and the process may be facilitated.

Advantageously, the protrusion extends in the circumferential direction from the facing end.

Preferably, the protrusion is delimited in radial direction by two lateral flat trapezoidal leg faces. This leads to facilitate the assembly of the ring segments of the split ring.

The protrusion may comprise a flat outer face connected to the lateral flat trapezoidal leg faces and extending radially.

In one embodiment, each pair of adjacent successive ring segments of the split-ring is secured together with at least one fixing plate, the fixing plate being disposed inside first, and second grooves respectively provided on frontal faces of the ring segments, the fixing plate being set back or flush with at least the face of each of the ring segments from which the first or second groove is formed.

Accordingly, the fixing plate do not protrude with respect to this frontal face of each ring segment provided with the first or second groove. Accordingly, the overall dimension of the bearing is not increased.

Preferably, the fixing plate is set back or flush with the split-ring.

Advantageously, an edge radius is provided between each flat trapezoidal leg face of the protrusion and the facing end, and between each flat trapezoidal leg face and the flat outer face, and an edge radius is provided between each flat trapezoidal leg face of the recess and the other facing end, and between each flat trapezoidal leg face and a flat inner bottom of the recess.

Advantageously, the bearing further comprises at least first and second alignment members extending through the fixing plate, the first alignment member protruding into a recess formed into the thickness of one of the ring segments, and the second alignment member protruding into a recess formed into the thickness of the other of the ring segments.

Accordingly, the ring segments of the split-ring may be easily and perfectly aligned during re-assembly, for example after the transport, with regard to its initial position during fabrication. The use of alignment members inserted into recesses facilitates the re-assembly process.

Preferably, the first and second alignment members are set back or flush with an outer surface of the fixing plate which is located on the side opposite to the first and second grooves of the ring segments. For example, each of the first and second alignment members may comprise a pin.

In one embodiment, the bearing further comprises at least one first fixing screw and at least one second fixing screws extending through the fixing plate. The first fixing screw is engaged inside a threaded hole formed onto one of the ring segments, and the second fixing screw is engaged inside a threaded hole formed onto the other of the ring segments. The threaded holes may be formed from the bottom of the associated groove.

The first and second fixing screws are distinct from the first and second alignment members.

Preferably, screw heads of the first and second fixing screws are set back or flush with the outer surface of the fixing plate which is located on the side opposite to the first and second grooves of the ring segments.

In one embodiment, each pair of adjacent successive ring segments of the split-ring may be secured together with an additional fixing plate, the additional fixing plate being disposed inside third and fourth grooves provided on frontal faces of the ring segments opposite to the frontal faces onto which are formed the first and second grooves, the additional fixing plate being set back or flush with at least these frontal faces.

Otherwise, the fixing plate(s) may be made from a rigid material, such as steel. This improves the rigidity of the bearing.

BRIEF DESCRIPTION OF THE DRAWINGS

The present invention and its advantages will be better understood by studying the detailed description of specific embodiments given by way of non-limiting examples and illustrated by the appended drawings on which.

DETAILED DESCRIPTION OF THE INVENTION

Figure 1:
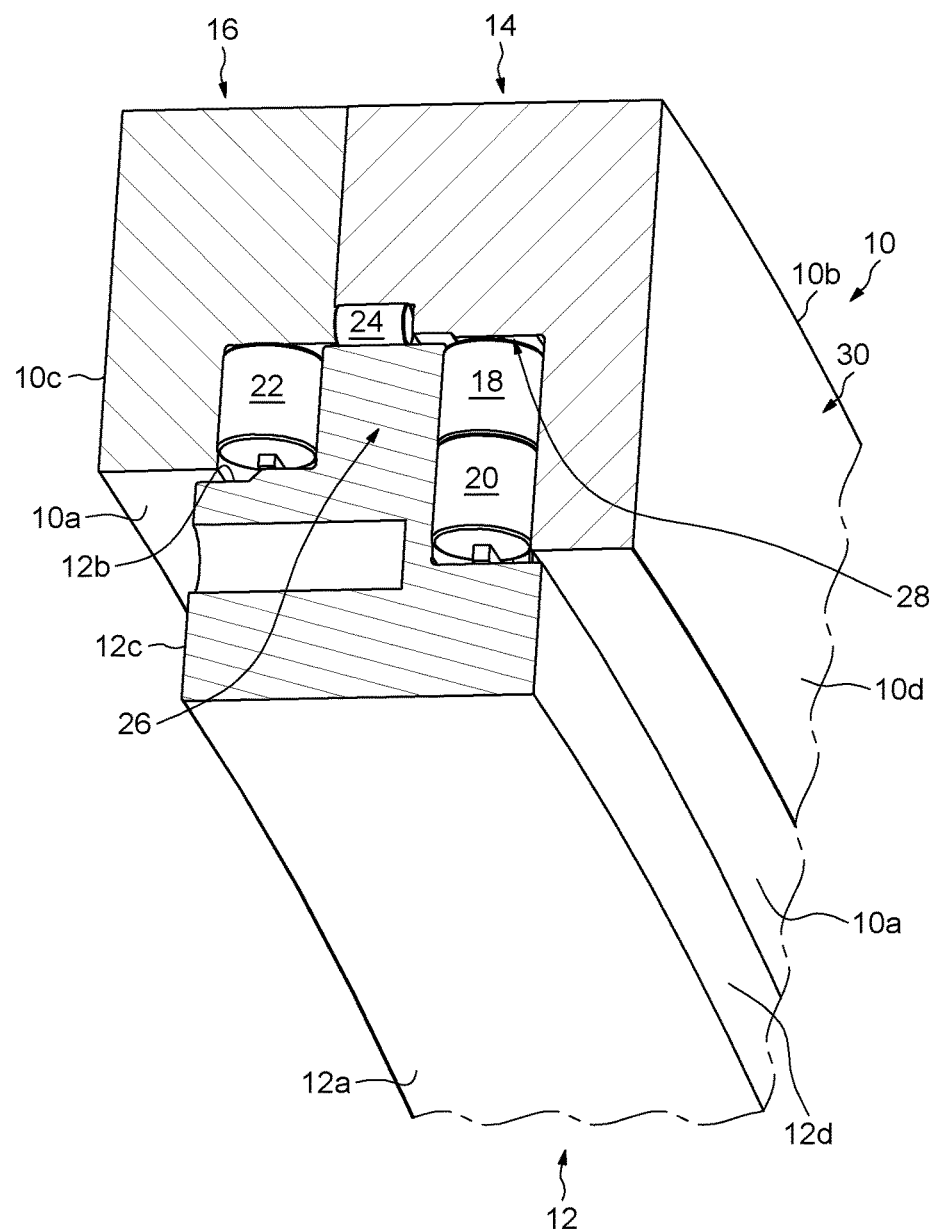
FIG. 1 is a partial cross-section of a rolling bearing according to a first example of the invention.

The rolling bearing as illustrated on FIG. 1 is a large diameter rolling bearing comprising an outer ring 10 and an inner ring 12. The rolling bearing may for example be used in a tunnel boring machine, a wind turbine or any other application using a large diameter rolling bearing.

The outer and inner rings 10, 12 are concentric and extend axially along the bearing rotation axis (not shown) which runs in an axial direction. The rings 10, 12 are of the solid type.

The outer ring 10 is formed as a split-ring and comprises a first ring 14 and a second ring 16 stacked one relative to the other in the axial direction. Each of the first and second rings 14, 16 of the outer ring is provided with a plurality of aligned through-holes (not illustrated) in order to be joined by fitting bolts.

As will be described later, the outer ring 14 is also formed as a split-ring in the circumferential direction.

In the illustrated example, the rolling bearing comprises three rows of axial rollers 18, 20, 22 which are arranged between the outer and inner rings 10, 12 in order to form an axial thrust, and a row of radial rollers 24 which are arranged between the rings to form a radial thrust.

The rollers 18 to 24 of one row are identical to one another. The axis of rotation of each roller 24 is parallel to the axis of the bearing and perpendicular to the axes of each or the rollers 18, 20 and 22. In the illustrated example, the row of rollers 18 is superimposed on the row of rollers 20. In the illustrated example, the diameter of the rollers 24 is smaller than the diameter of the rollers 18 to 22.

The inner ring 12 comprises an annular protruding nose 26 engaging into an annular groove 28 of the outer ring. The nose 26 extends radially outwards. The groove 28 opens in a radial direction inwardly towards the inner ring 12.

The inner ring 12 also comprises an inner cylindrical bore 12a and a stepped outer cylindrical surface 12b which is radially opposite to the bore 12a. The protruding nose 26 protrudes radially from the outer cylindrical surface 12b. The inner ring 12 further comprises two opposite radial frontal faces 12c, 12d which axially delimit the bore 12a and the outer cylindrical surface 12b.

The rows of rollers 18 to 22 are arranged axially between the nose 26 of the inner ring and the groove 28 of the outer ring. The rows of rollers 18, 20 and the row of rollers 22 are disposed on each side of the nose 26 of the inner ring.

The rollers 24 are arranged radially between raceways formed on the nose 26 and the groove 28. The row of rollers 24 is radially offset outwards with respect to the rows of rollers 18 to 22. The row of rollers 24 is axially located between the rows of rollers 18 to 22.

The outer ring 10 comprises an inner stepped cylindrical surface or bore 10a from which the groove 28 is formed. The outer ring 10 also comprises an outer cylindrical surface 10b which is radially opposite to the bore 10a. The outer ring 10 further comprises two opposite radial frontal faces 10c, 10d which axially delimit the bore 10a and the outer surface 10b of the ring.

As previously mentioned, the outer ring 10 is divided in the circumferential direction. Each of the first and second rings 14, 16 of the outer ring is segmented. Since the designs of the two rings 14, 16 are similar, only the ring 14 will be described here.

Figure 2:
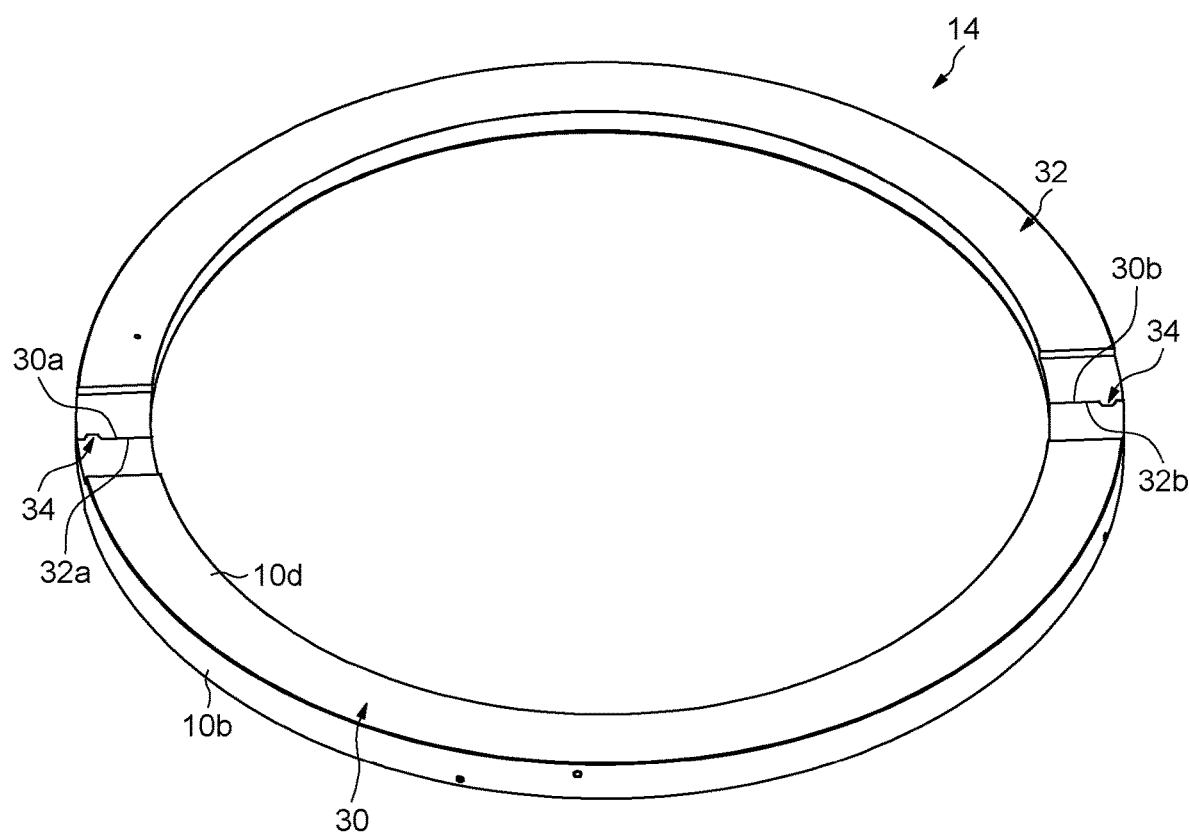
FIG. 2 is a perspective view of an outer ring of the rolling bearing of FIG. 1.

As shown on FIG. 2, the first ring 14 of the outer ring is formed by two successive circumferential ring segments 30, 32. Alternatively, the first ring 14 may comprise at least three successive circumferential ring segments.

Each ring segment 30, 32 of the first ring 14 of the outer ring is provided with a first end 30a, 32a and with a second end 30b, 32b which delimit the ring segment in the circumferential direction. The first end 30a, 32a and the second end 30b, 32b of each ring segment 30, 32 are opposite in the circumferential direction.

In the illustrated example, the first ends 30a, 32a of the ring segments 30, 32 face each other and abut in the circumferential direction. Similarly, the second ends 30b, 32b of the ring segments 30, 32 also face each other and abut in the circumferential direction. The first ends 30a, 32a form a first pair of facing ends, and the second ends 30b, 32b form a second pair of facing ends of the ring segments 30, 32.

The ring segments 30, 32 forming the first ring 14 may be identical one to another. The outer cylindrical surface of each ring segment 30, 32 delimits partly the outer surface 10b of the outer ring. One of the frontal faces of each ring segment 30, 32 delimits partly the frontal face 10d of the outer ring.

Figure 3:
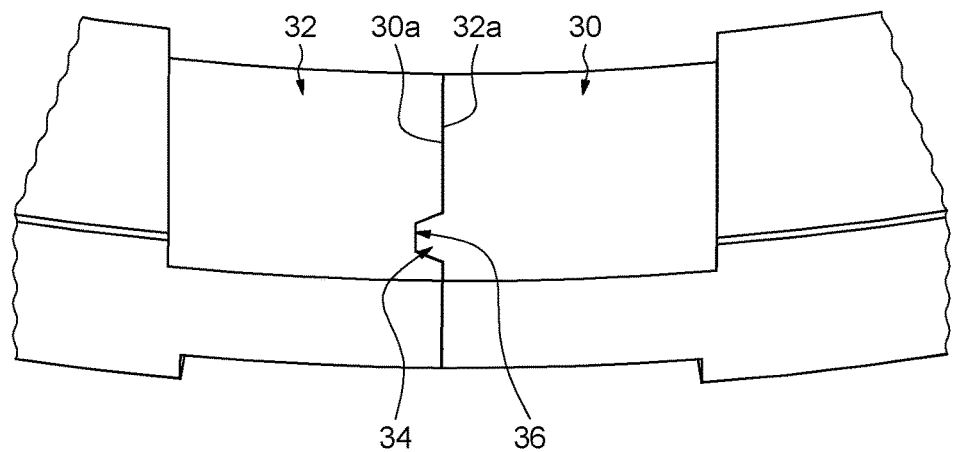
FIG. 3 is a detail view of FIG. 2.
Figure 4:
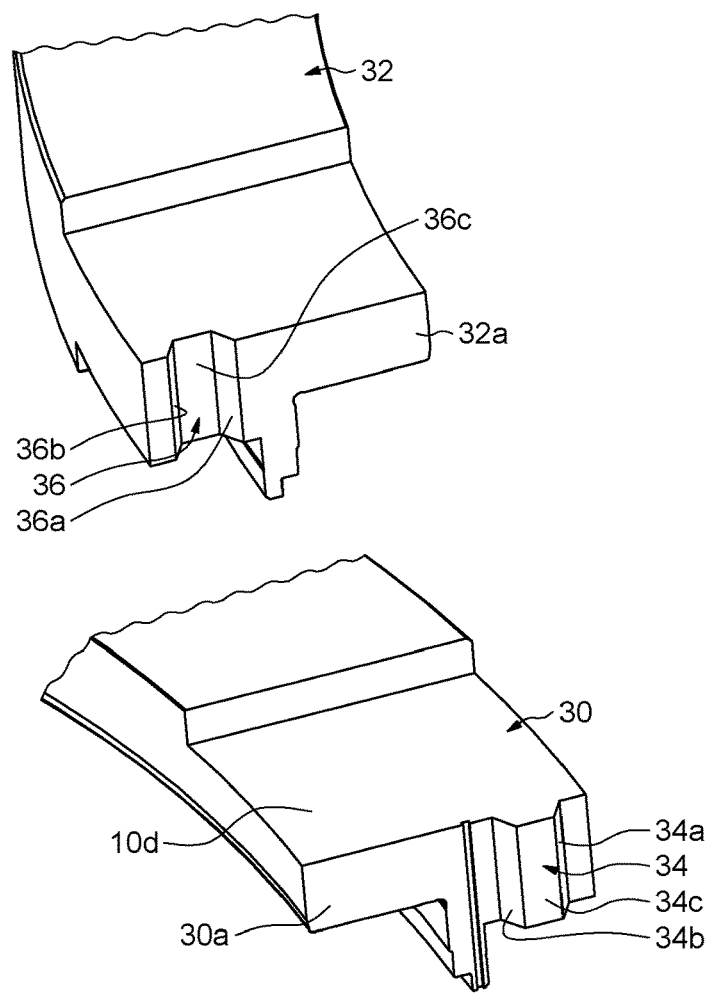
FIG. 4 is an exploded perspective view of FIG. 3.

As shown more clearly on FIGS. 3 and 4, the first end 30a of the ring segment 30 comprises a protrusion 34 which protrudes outwards into a recess 36 of complementary shape formed on the first end 32a of the ring segment 32. The protrusion 34 is made in one part with the ring segment 30. The protrusion 34 extends in the circumferential direction from the first end 30a. The protrusion 34 extends axially along the first end 30a. Here, the protrusion 34 extends axially along the entire length of the first end 30a.

The protrusion 34 is provided with two opposite lateral flat trapezoidal leg faces 34a, 34b which axially delimit the protrusion in the radial direction. The flat trapezoidal leg faces 34a, 34b extend obliquely outwards in the circumferential direction from the first end 30a. In the illustrated example, each flat trapezoidal leg face 34a, 34b is connected to the first end 30a with a sharp edge. The flat trapezoidal leg faces 34a, 34b extends obliquely towards each other.

The protrusion 34 is also provided with a flat outer face 34c connected to the flat trapezoidal leg faces 34a, 34b. The outer face 34c extends radially. The outer face 34c is offset in the circumferential direction with respect to the first end 30a of the ring segment 30. In the illustrated example, each flat trapezoidal leg face 34a, 34b is connected to the outer face 34c with a sharp edge.

The shape of the recess 36 formed on the first end 32a of the ring segment 32 is complementary to that of the protrusion 34 of the first end 30a of the ring segment 30. The recess 36 extends inwards in the circumferential direction from the first end 32a. The recess 36 extends axially along the first end 32a. Here, the recess 36 extends axially along the entire length of the first end 32a.

The recess 36 is provided with two opposite lateral flat trapezoidal leg faces 36a, 36b which axially delimit the recess in the radial direction. The flat trapezoidal leg faces 36a, 36b extend obliquely inwards in the circumferential direction from the first end 32a. In the illustrated example, each flat trapezoidal leg face 36a, 36b is connected to the first end 32a with a sharp edge. The flat trapezoidal leg faces 36a, 36b extends obliquely towards each other.

The recess 36 is also provided with a flat inner bottom 36c connected to the flat trapezoidal leg faces 36a, 36b. The inner bottom 36c extends radially. The inner bottom 36c is offset in the circumferential direction with respect to the first end 32a of the ring segment 32. In the illustrated example, each flat trapezoidal leg face 36a, 36b is connected to the inner bottom 36c with a sharp edge.

The protrusion 34 formed on the first end 30a of the ring segment is located inside the recess 36 formed on the first end 32a of the ring segment 32. The protrusion 34 is entirely housed inside the recess 36. The flat trapezoidal leg faces 34a, 34b of the protrusion are respectively in contact with the flat trapezoidal leg faces 34a, 34b of the recess 36. The outer face 34c of the protrusion are in contact with the inner bottom 36c of the recess.

Referring once again to FIG. 2, the second end 32b of the ring segment 32 comprises a protrusion 34 which protrudes outwards into a recess (not referenced) formed on the second end 30b of the ring segment 30 in order to radially align these second ends 30b, 32b of the ring segments 20. The protrusion 34 of the second end 32b of the ring segment 32 and the recess of the second end 30b of the ring segment 30 are respectively identical to the protrusion 34 of the first end 30a of the ring segment 30 and the recess 36 of the first end 32a of the ring segment 32 previously described.

Advantageously, the first ends 30a, 32a and the second ends 30b, 32b of the ring segments 30, 32 are formed by an electro-erosion cutting process.

Figure 5:
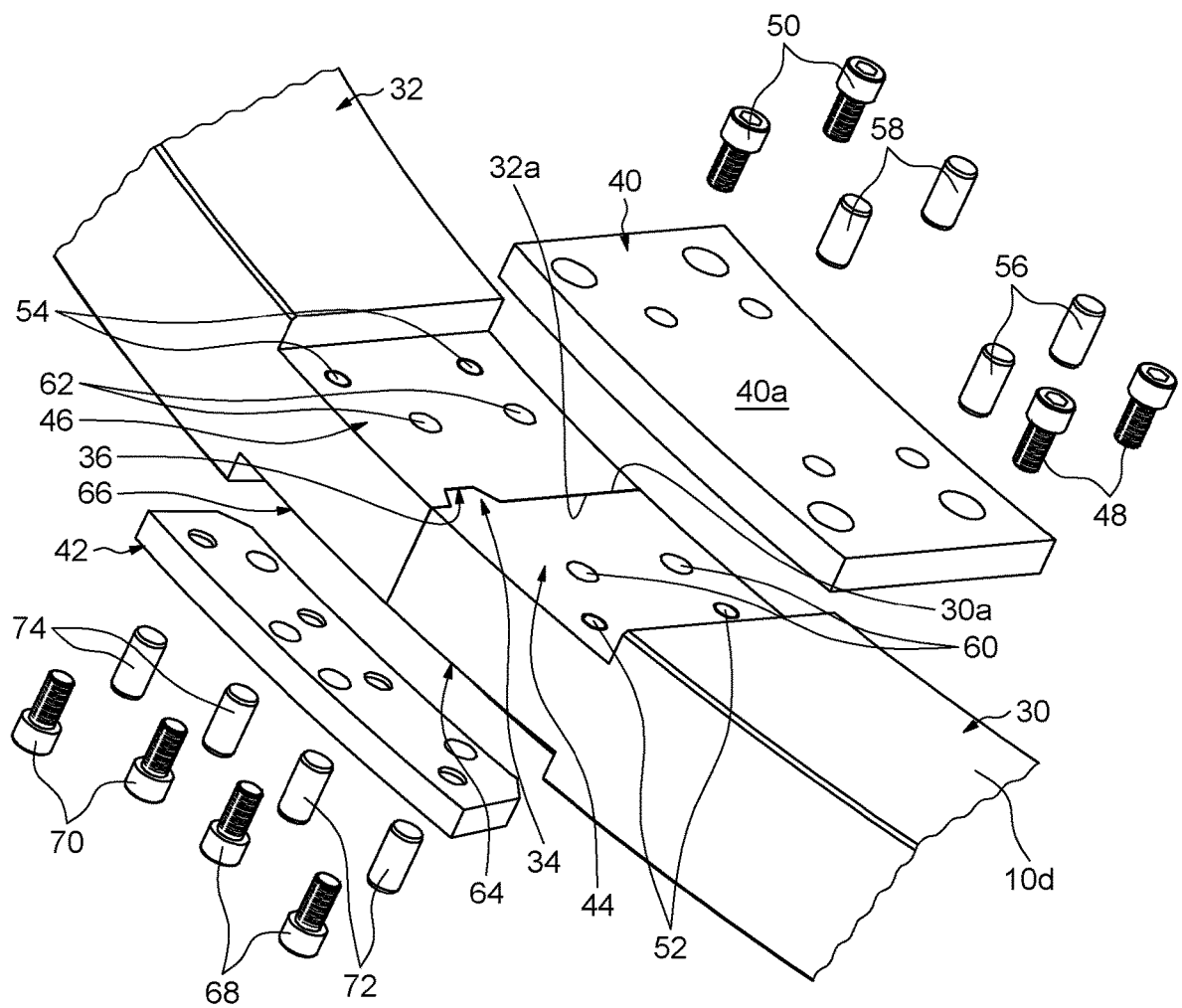
FIG. 5 is a partial exploded view of the outer ring of FIGS. 2 to 4 with fixing plates.

In the illustrated example, the outer ring 10 is also provided with two pairs of fixing plates 40, 42 to secure together the successive ring segments 30, 32. Each pair of fixing plates 40, 42 secures together each pair of facing end portions of two successive ring segments 30, 32. On FIG. 5, only one pair of fixing plates 40, 42 is visible. The number of pair of fixing plates 40, 42 is equal to the number of successive circumferential ring segments 30, 32.

The mounting of one pair of fixing plates 40, 42 will be described here, it being understood that the mounting of the other pair of fixing plates 42 is identical.

In order to mount the fixing plate 40 on the outer ring, first and second grooves 44, 46 are respectively formed on the ring segments 30, 32 of the first ring 14 of the outer ring.

The grooves 44, 46 are provided on the frontal faces of the ring segments 30, 32 delimiting partly the frontal face 10d of the outer ring. The groove 44 opens on the first end 30a in the circumferential direction. The groove 46 opens on the first end 32a in the circumferential direction. The groove 46 faces the groove 44 in the circumferential direction. In the illustrated example, the groove 46 is identical to the groove 44. Alternatively, the grooves 44, 46 may have different shapes and/or dimensions.

As will be described later, the fixing plate 40 is entirely housed inside the grooves 44, 46 of the ring segments 30, 32. The fixing plate 40 is mounted radially against the bottoms of the grooves 44, 46.

The rolling bearing also comprises first and second screws 48, 50 to fix the fixing plate 40 inside the grooves 44, 46 of the ring segments 30, 32. In the illustrated example, the rolling bearing comprises two first screws 48 and two second screws 50. Alternatively, it could be possible to foresee a different number of first and second screws 48, 50.

Each of the first screw 48 extends through the fixing plate 40 and is engaged inside a threaded hole 52 formed from the bottom of the groove 44. Each threaded hole 52 extends axially into the thickness of the ring segment 30. The first screws 48 secure the fixing plate 40 onto the ring segment 30.

Similarly, each of the second screw 50 extends through the fixing plate 40 and is engaged inside a threaded hole 54 formed from the bottom of the groove 46. Each threaded hole 54 extends axially into the thickness of the ring segment 32. The second screws 50 secure the fixing plate 40 onto the ring segment 32.

The rolling bearing further comprises first and second pins 56, 58 extending through the fixing plate 40 and protruding respectively into first and second recesses 60, 62 formed on the ring segments 30, 32. The first recesses 60 are formed from the bottom of the groove 44. The second recesses 62 are formed from the bottom of the groove 46. The first and second recesses 60, 62 extend axially.

Each pin 56, 58 is entirely housed inside the fixing plate 40 and the associated recess 60, 62. Each pin 56, 58 is secured inside the associated recess 60, 62 by any appropriate means, for example by press-fitting.

As previously mentioned, the fixing plate 40 is entirely housed inside the grooves 44, 46 of the ring segments 30, 32 of the first ring of the outer ring. In other words, the fixing plate 40 does not protrude with respect to the ring segments 30, 32. In the illustrated example, the outer surface 40a of the fixing plate is flush with the frontal faces of the ring segments 30, 32 delimiting partly the frontal face 10d of the outer ring.

The overall dimension of the rolling bearing is not increased by the fixing plate 40. In order to not increase the overall dimension of the rolling bearing, in the illustrated example, the pins 56, 58 and the screw heads of screws 48, 50 are also set back with the outer surface 40a of the fixing plate.

Similarly, to the fixing plate 40, in order to mount the fixing plate 42 on the outer ring, third and fourth grooves 64, 66 are respectively formed on the frontal faces of the ring segments 30, 32 which are opposite to the frontal faces onto which are formed the first and second grooves 44, 46.

The groove 64 opens on the first end 30a in the circumferential direction. The groove 66 opens on the first end 32a in the circumferential direction. The groove 66 faces the groove 64 in the circumferential direction. In the illustrated example, the groove 66 is identical to the groove 64. Alternatively, the grooves 64, 66 may have different shapes and/or dimensions.

The fixing plate 42 is entirely housed inside the grooves 64, 66 of the ring segments 30, 32. The fixing plate 42 is mounted radially against the bottoms of the grooves 64, 66.

The rolling bearing also comprises first and second screws 68, 70 to fix the fixing plate 42 inside the grooves 64, 66 of the ring segments 30, 32. In the illustrated example, the rolling bearing comprises two first screws 68 and two second screws 70. Alternatively, it could be possible to foresee a different number of first and second screws 68, 70.

Each of the first screw 68 extends through the fixing plate 42 and is engaged inside a threaded hole (not visible) formed from the bottom of the groove 64. Each threaded hole extends axially into the thickness of the ring segment 30. The first screws 68 secure the fixing plate 42 onto the ring segment 30.

Similarly, each of the second screws 70 extends through the fixing plate 42 and is engaged inside a threaded hole (not visible) formed from the bottom of the groove 66. Each threaded hole extends axially into the thickness of the ring segment 32. The second screws 70 secure the fixing plate 42 onto the ring segment 32.

The rolling bearing further comprises first and second pins 72, 74 extending through the fixing plate 42 and protruding respectively into first and second recesses (not visible) formed on the ring segments 30, 32. The first recesses are formed from the bottom of the groove 64. The second recesses are formed from the bottom of the groove 66. The first and second recesses 60, 62 extend axially.

Each pin 72, 74 is entirely housed inside the fixing plate 42 and the associated recess. Each pin 72, 74 is secured inside the associated recess by any appropriate means, for example by press-fitting.

As previously mentioned, the fixing plate 42 is entirely housed inside the grooves 64, 66 of the ring segments 30, 32 of the first ring of the outer ring. In other words, the fixing plate 42 does not protrude with respect the ring segments 30, 32. The outer surface of the fixing plate is flush with the frontal faces of the ring segments 30, 32 onto which are formed the grooves 64, 66. In the illustrated example, the pins 72, 74 and the screw heads of screws 68, 70 are also set back with the outer surface 40a of the fixing plate.

Figure 6:
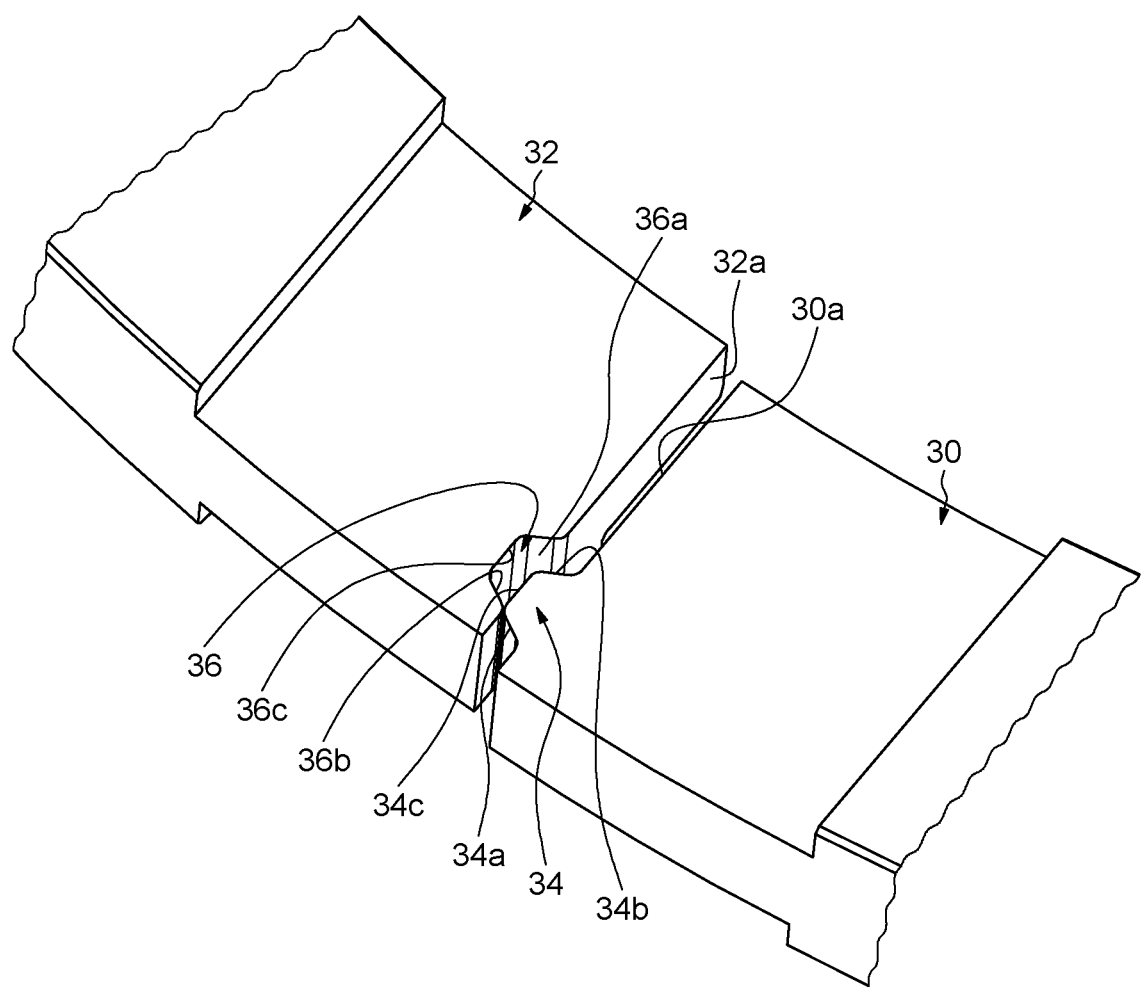
FIG. 6 is a detail perspective view of an outer ring of a rolling bearing according to a second example of the invention.

The example shown on FIG. 6, in which identical parts are given identical references, differs from the first example in that an edge radius is provided between each flat trapezoidal leg face 34a, 34b of the protrusion and the first end 30a, and also between each flat trapezoidal leg face 34a, 34b and the outer face 34c. Similarly, an edge radius is provided between each flat trapezoidal leg face 36a, 36b of the recess and the first end 32a, and also between each flat trapezoidal leg face 36a, 36b and the inner bottom 36c. The edge radii may be equal.

Such chamfers facilitate the assembly of the ring segments 30, 32, notably in case of deformations of these ring segments.

In the illustrated examples, the outer ring 10 is formed as a split-ring in the axial direction. Alternatively, according to the design of the rolling bearing, the outer ring 10 may be not segmented in the axial direction, but only in the circumferential direction.

In the previous described examples, only the outer ring 10 is segmented in the circumferential direction. Alternatively, or in combination, the inner ring may also be formed as a split-ring comprises at least two successive circumferential ring segments.

In the described examples, the rolling bearing is provided with three rows of rolling elements. Alternatively, the rolling bearing may comprise only one row of rolling elements, or two rows of rolling elements, or four or more rows of rolling elements. In the illustrated example, the rolling elements are rollers. The rolling bearing may comprise other types of rolling elements, for example balls. In another variant, the bearing may also be a sliding bearing having no rolling element.

The invention claimed is:

1. A bearing comprising an outer ring and an inner ring capable of rotating concentrically relative to one another, at least one of the inner and outer rings being split into a plurality of successive circumferential ring segments, wherein for each pair of facing ends of adjacent successive ring segments of the split-ring, one of the facing ends comprises at least one protrusion made in one part with the associated ring segment and protruding into a recess of complementary shape formed onto the other facing end to align the pair of facing ends in radial direction, wherein the at least one protrusion comprises two flat trapezoidal leg faces extending outwardly from the facing end, the two flat trapezoidal leg faces delineating a flat outer face of the at least one protrusion, the flat outer face being parallel to the facing end, wherein the width of each of the two flat trapezoidal leg faces is shorter than the width of the flat outer face, and each pair of adjacent successive ring segments of the split-ring is secured together with at least one fixing plate, the fixing plate being disposed inside first and second grooves respectively provided on frontal faces of the ring segments, the fixing plate being set back or flush with at least the face of each of the ring segments from which the first or second groove is formed.

2. The bearing according to claim 1, wherein the protrusion extends in the circumferential direction from the facing end.

3. The bearing according to claim 1, wherein an edge radius is provided between each flat trapezoidal leg face of the protrusion and the facing end, and between each flat trapezoidal leg face and the flat outer face, and wherein an edge radius is provided between each flat trapezoidal leg face of the recess and the other facing end, and between each flat trapezoidal leg face and a flat inner bottom of the recess.

4. The bearing according to claim 1, further compromising at least first and second alignment members extending through the fixing plate, the first alignment member protruding into a recess formed into the thickness of one of the ring segments, and the second alignment member protruding into a recess formed into the thickness of the other of the ring segments.

5. The bearing according to claim 1, further comprising at least one first fixing screw and at least one second fixing screw extending through the fixing plate, the first fixing screw being engaged inside a threaded hole formed onto one of the ring segments, and the second fixing screw being engaged inside a threaded hole formed onto the other of the ring segments.

6. The bearing according to claim 5, further comprising at least first and second alignment members extending through the fixing plate, the first alignment member protruding into a recess formed into the thickness of one of the ring segments, and the second alignment member protruding into a recess formed into the thickness of the other of the ring segments, and wherein the first and second alignment members and screw heads of the first and second fixing screws are set back or flush with an outer surface of the fixing plate which is located on the side opposite to the first and second grooves of the ring segments.

7. The bearing according to claim 1, wherein each pair of adjacent successive ring segments of the split-ring is secured together with an additional fixing plate, the additional fixing plate being disposed inside third and fourth grooves provided on frontal faces of the ring segments opposite to the frontal faces onto which are formed the first and second grooves, the additional fixing plate being set back or flush with at least these frontal faces.

* * * * *